United States Patent
Bi et al.

(10) Patent No.: US 11,567,961 B2
(45) Date of Patent: *Jan. 31, 2023

(54) USING FLAT DATA INPUT FOR SIMULTANEOUS APPLICATION OF MULTIPLE SEPARATE CALCULATIONS RULE SETS TO OBTAIN MULTIPLE OUTPUT RESULTS

(71) Applicant: UTEGRATION LLC, Houston, TX (US)

(72) Inventors: Kai Bi, Houston, TX (US); Michael Bargar, Houston, TX (US)

(73) Assignee: Utegration LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/953,292

(22) Filed: Nov. 19, 2020

(65) Prior Publication Data

US 2021/0173845 A1    Jun. 10, 2021

Related U.S. Application Data

(63) Continuation of application No. 15/980,989, filed on May 16, 2018, now Pat. No. 10,872,092.

(51) Int. Cl.
*G06F 16/25* (2019.01)
*G06F 16/28* (2019.01)

(52) U.S. Cl.
CPC .......... *G06F 16/252* (2019.01); *G06F 16/284* (2019.01)

(58) Field of Classification Search
CPC .............................. G06F 16/252; G06F 16/284
See application file for complete search history.

(56) References Cited

U.S. PATENT DOCUMENTS

| 6,446,089 B1* | 9/2002 | Brodersen ............. G06F 16/278 |
| 8,549,540 B1* | 10/2013 | Dixon ..................... G06F 9/546 719/314 |
| 8,874,621 B1* | 10/2014 | Goodwin .............. G06F 16/289 707/756 |
| 2004/0236620 A1* | 11/2004 | Chauhan ................ G06Q 10/06 705/7.14 |
| 2005/0114409 A1* | 5/2005 | Sinha .................... G06F 16/219 707/999.203 |
| 2009/0106149 A1* | 4/2009 | Bennett ............. G06Q 20/4016 705/42 |
| 2015/0032721 A1* | 1/2015 | Valentin ................ H04L 67/025 707/736 |

(Continued)

*Primary Examiner* — James Trujillo
*Assistant Examiner* — Michal Bogacki
(74) *Attorney, Agent, or Firm* — Ferguson Braswell Fraser Kubasta PC

(57) ABSTRACT

A method may include updating database posting logic to obtain an updated database posting logic that, during a posting process to a database, adds a data field to a new line item being posted via the posting process. The method may further include receiving information from a data provider. The method may further include posting, using the updated database posting logic, the information to the database as a line item including various fields including the data field. The method may further include receiving a request to generate a transactional report. The method may further include using the data field to identify the line item. The method may further include generating the transactional report using the line item.

20 Claims, 6 Drawing Sheets

(56) References Cited

U.S. PATENT DOCUMENTS

| | | | | |
|---|---|---|---|---|
| 2015/0142858 A1* | 5/2015 | Bryan | ............ | G06F 16/214 |
| | | | | 707/809 |
| 2015/0170382 A1* | 6/2015 | Bhatia | ............ | G06Q 40/00 |
| | | | | 345/440 |
| 2015/0193123 A1* | 7/2015 | Inukonda | ......... | G06F 40/174 |
| | | | | 715/780 |
| 2016/0147618 A1* | 5/2016 | Lee | ............ | G06F 11/1662 |
| | | | | 707/625 |
| 2017/0116179 A1* | 4/2017 | Gagné-Langevin | ......... | |
| | | | | G06F 40/117 |
| 2017/0286067 A1* | 10/2017 | Eberlein | ......... | G06F 16/21 |
| 2019/0042782 A1* | 2/2019 | Aylett | ............ | G06F 21/6218 |

* cited by examiner

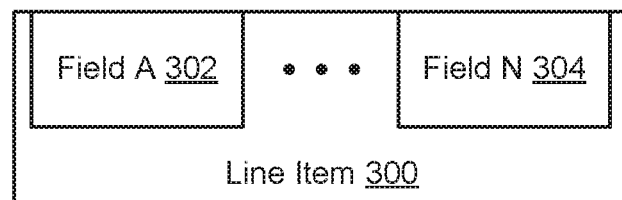
FIG. 3.1
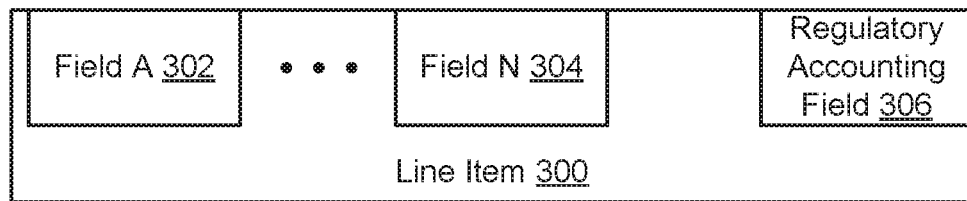
FIG. 3.2

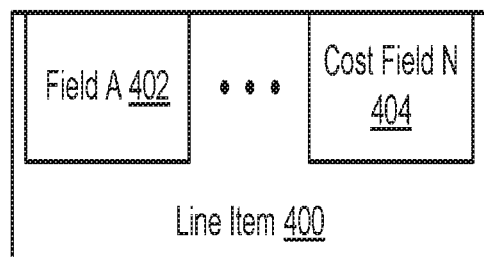
FIG. 4.1
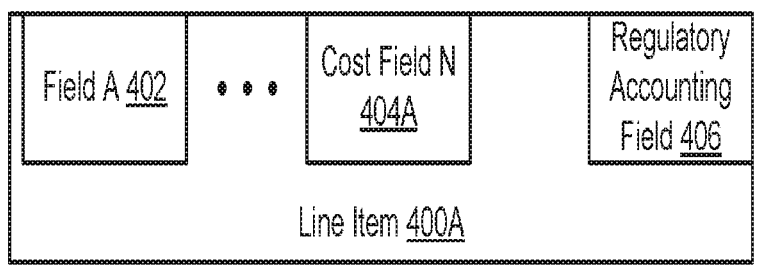
FIG. 4.2
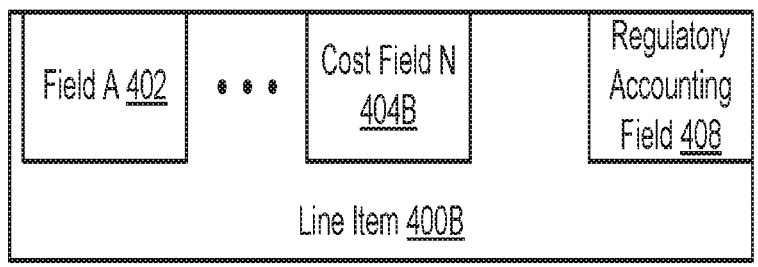
FIG. 4.3
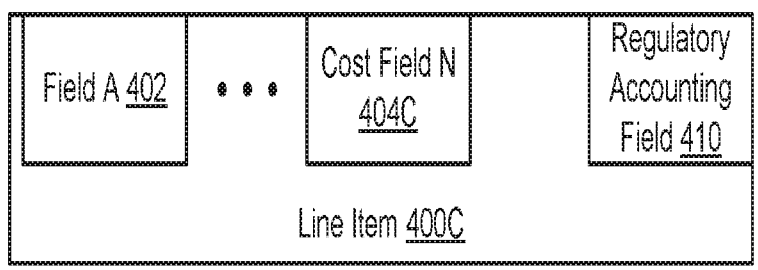
FIG. 4.4

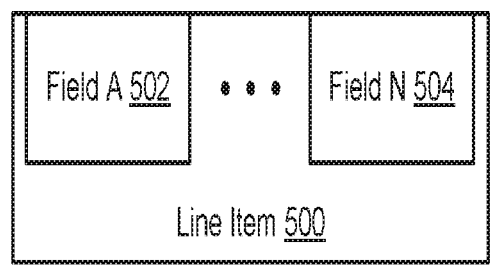
FIG. 5.1
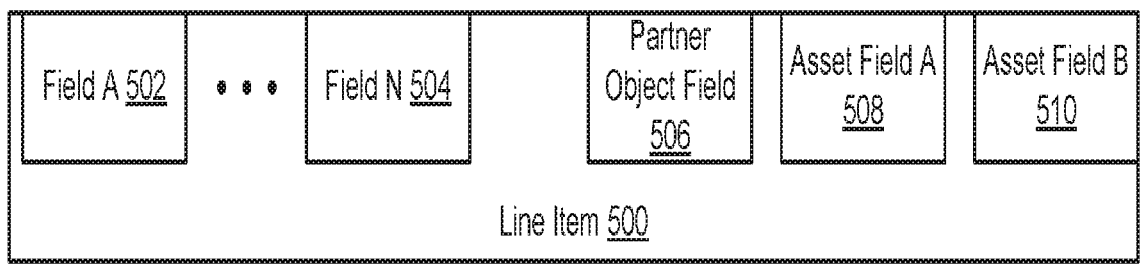
FIG. 5.2

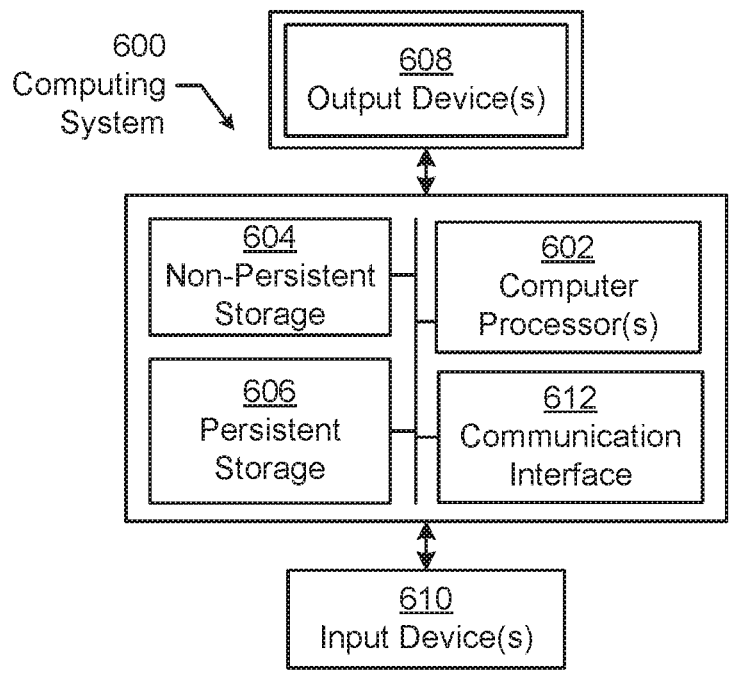
FIG. 6.1
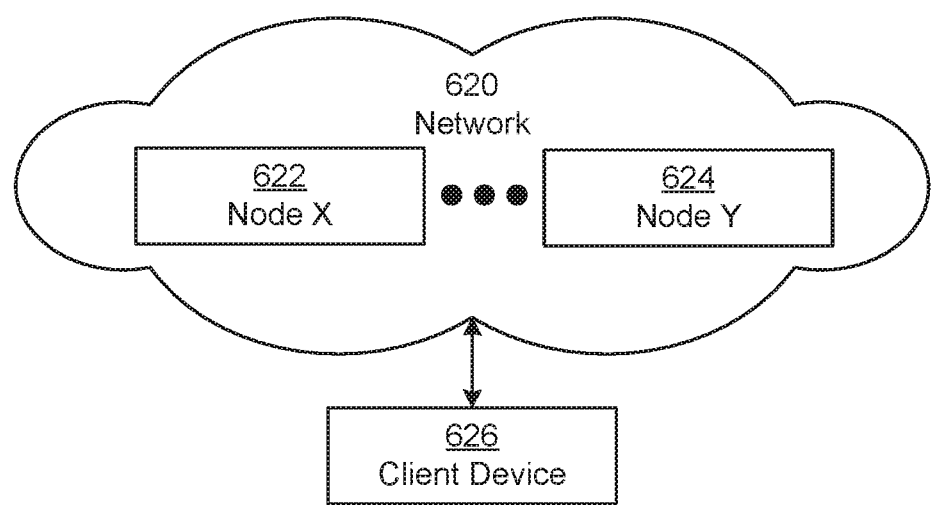
FIG. 6.2

USING FLAT DATA INPUT FOR SIMULTANEOUS APPLICATION OF MULTIPLE SEPARATE CALCULATIONS RULE SETS TO OBTAIN MULTIPLE OUTPUT RESULTS

CROSS-REFERENCE TO RELATED APPLICATIONS

This application claims priority to U.S. Provisional Patent Application Ser. No. 62/507,080, titled "USING FLAT DATA INPUT SET FOR SIMULTANEOUS APPLICATION OF MULTIPLE SEPARATE CALCULATIONS RULE SETS TO OBTAIN MULTIPLE OUTPUT RESULTS", which was filed on May 16, 2017, and is incorporated herein by reference.

BACKGROUND

Utility providers often have to generate accounting reports and/or trace costs from settlement back to origination. Accounting reports often fall into one of two categories: financial and regulatory. Financial accounting reports are often meant to be consumed by audiences including, but not limited to, stakeholders, shareholders, investors, the public, etc. Such reports may be aimed at allowing the utility provider to provide information required for conformance with Generally Accepted Accounting Principles (GAAP), which may be referred to herein as GAAP accounting. Regulatory accounting reports are often meant to be consumed by regulatory entities such as various state, local, or national governments, councils, etc. that exist to regulate one or more utility types (e.g., electric power providers, telecommunications providers, etc.). One specific, non-limiting example of such regulatory reports are reports required by the Federal Energy Regulatory Commission (FERC).

Generally, financial accounting reports are created and/or updated as financial data relating to various aspects of the utility provider is obtained. These reports are often used to update aggregate or total reports. At the end of a given reporting period (e.g., at the end of each month), the financial accounting statements and various aggregations may be used to create regulatory accounting reports. In some instances, the regulatory accounting reports lead to requests for more regulatory reports that provide greater detail as to where a given cost originated, and where it was settled ultimately or in the interim (e.g., to what asset was a specific cost applied). Using the financial accounting statements to generate regulatory accounting statements often requires determining which financial accounting information is relevant to a give regulatory accounting report, identifying such line items in a database, and duplicating the one or more line items in order to generate the regulatory accounting report. Moreover, the financial accounting reports and the regulatory accounting reports must often be reconciled with one another to avoid discrepancies, and any errors or changes in the former lead to necessary changes in the latter.

SUMMARY

In general, in one aspect, the invention relates to a method. The method includes updating database posting logic to obtain an updated database posting logic that, during a posting process to a database, adds a data field to a new line item being posted via the posting process. The method further includes receiving information from a data provider. The method further includes posting, using the updated database posting logic, the information to the database as a line item including various fields including the data field. The method further includes receiving a request to generate a transactional report. The method further includes using the data field to identify the line item. The method further includes generating the transactional report using the line item.

In general, in one aspect, the invention relates to a non-transitory computer readable medium including instructions that, when executed by a computer processor, perform a method. The method includes updating database posting logic to obtain an updated database posting logic that, during a posting process to a database, adds a data field to a new line item being posted via the posting process. The method further includes receiving information from a data provider. The method further includes posting, using the updated database posting logic, the information to the database as a line item including various fields including the data field. The method further includes receiving a request to generate a transactional report. The method further includes using the data field to identify the line item. The method further includes generating the transactional report using the line item.

In general, in one aspect, the invention relates to a system. The system includes a report generator operatively connected to a data provider and a report data repository. The report generator includes a data posting logic engine, a database operatively connected to the data posting logic engine, and a calculation engine operatively connected to the database. The report generator updates the database posting logic engine to obtain an updated database posting logic engine that, during a posting process to a database, includes a first data field and adds a second data field to a new line item being posted via the posting process. The report generator receives information from a data provider. The report generator posts, using the updated database posting logic engine, the information to the database as a line item including a plurality of fields including the first data field and the second data field. The report generator receives a request to generate a transactional report. The report generator uses the second data field to identify the line item. The report generator generates the transactional report using the line item using the calculation engine. The report generator stores the transactional report in the report data repository. The report generator receives a second request to generate a second transactional report. The report generator uses the first data field to identify the line item. The report generator generates the transactional report using the line item using the calculation engine. The report generator stores the transactional report in the report data repository.

Other aspects of the invention will be apparent from the following description and the appended claims.

BRIEF DESCRIPTION OF DRAWINGS

FIG. 3.1 and FIG. 3.2 show an example in accordance with one or more embodiments of the invention.

FIG. 4.1, FIG. 4.2, FIG. 4.3, and FIG. 4.4 show an example in accordance with one or more embodiments of the invention.

FIG. 5.1 and FIG. 5.2 show an example in accordance with one or more embodiments of the invention.

FIG. 6.1 shows a computing system, in accordance with one or more embodiments of the invention.

FIG. 6.2 shows a group of computing systems, in accordance with one or more embodiments of the invention.

DETAILED DESCRIPTION

Figure 1:
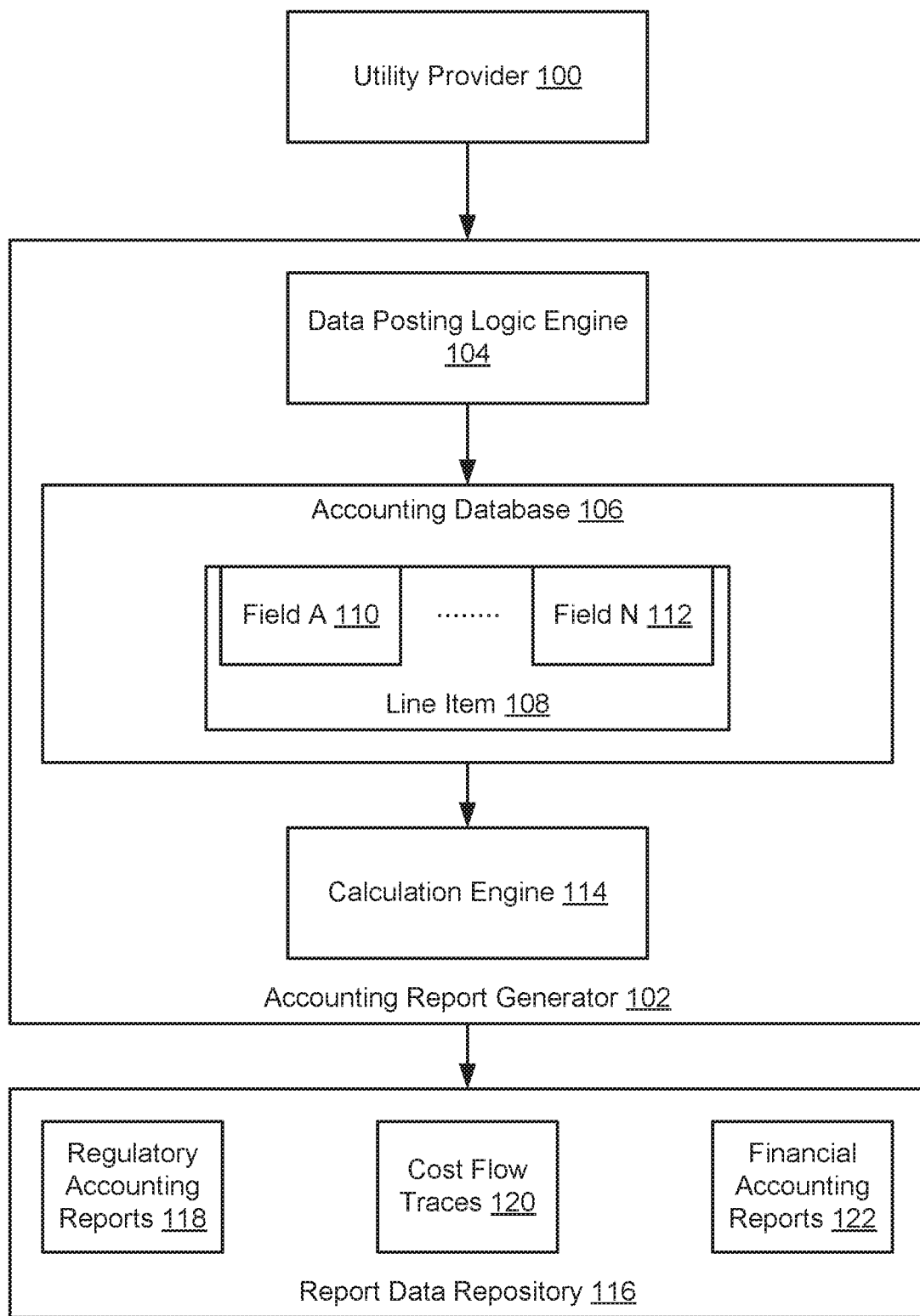
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention relate to a method, system, and non-transitory computer readable medium for generating transactional reports, such as financial and regulatory accounting reports, and/or performing cost flow traces, with a reduced need for accounting data replication and/or reconciliation between financial accounting reports and regulatory accounting reports. Specifically, in one or more embodiments of the invention, accounting information may be stored as one or more line items in a database that includes a number of data fields per line item. In one or more embodiments of the invention, one or more data fields are added to the line item during a posting of the line item to a database to allow the same line item data to be used at the same time to generate both financial accounting statements and regulatory accounting statements, and other additional data fields may be added to the line items to allow tracing of settled costs back to the origination of such costs.

In particular, data transactions may be organized within a database for tracing costs and other data parameters among different data transactions, e.g., with respect to different accounting transactions. For example, the addition of new data fields to database line items may allow for real time analysis of both financial accounting and regulatory accounting in order to generate up-to-date reports. With previous databases and database management systems, a new database report may not reflect updated information obtained for earlier transactions, such as updated settlement information or updated allocation information. Thus, in a cost flow trace, adding fields to database line items may enable changes in various data transactions to be reflected in the cost flow trace in real time without performing a new query through each and every data field.

Likewise, real time transaction flow tracing, such as cost flow tracing, may be requested in conjunction with one or more regulatory accounting reports provided to one or more regulatory entities. Such capabilities may allow decision makers of data providers, such as utility providers, to assess in real time the impact of decisions. For example, decisions may be analyzed in real time with respect to different regulatory regimes under which an entity operates, while the entity also retains the ability to do the same with regards to GAAP accounting, all with minimal data replication and a reduction in the need for accounting report reconciliation.

FIG. 1 shows a system in accordance with one or more embodiments of the invention. As shown in FIG. 1, the system includes a utility provider (100), an accounting report generator (102), and a report data repository (116). The accounting report generator may include a data posting logic engine (106), a calculation engine (114), and an accounting database (106). The accounting database (106) may include any number of line items (e.g., line item (108)), each of which may include any number of fields (e.g., field A (110), field N (112)). In some embodiments, the accounting database is a relational database with one or more relations, e.g., a one-to-one link or a one-to-many links, managed by a database management system. Each of these components is described below.

In one or more embodiments of the invention, the system includes a utility provider (100). In one or more embodiments of the invention, a utility provider (100) is a data providing entity that provides a utility to customers. Examples of utilities that a utility provider may provide to a customer include, but are not limited to, electricity, natural gas, other energy, telecommunications (e.g., phone, cable television, internet, etc.). In one or more embodiments of the invention, a utility provider (100) has obligations to report accounting information to various entities for various reasons. As an example, a utility provider (100) may need to provide financial accounting reports for GAAP accounting purposes to entities such as shareholders. As another example, a utility provider (100) may need to provide regulatory accounting reports and/or regulatory reports related to cost flow tracing to regulatory oversight entities such as FERC.

In one or more embodiments of the invention, the utility provider (100) is operatively connected to at least one accounting report generator (102). In one or more embodiments of the invention, an accounting report generator (102) is any hardware (e.g., circuitry), software, firmware, or any combination thereof that includes functionality to apply generate financial and regulatory accounting reports. An accounting report generator (102) may be implemented (i.e., execute) on a computing device.

A computing device is any device or any set of devices capable of electronically processing instructions and that includes at least the minimum processing power, memory, input and output device(s), and network connectivity in order to contribute to the performance of at least some portion of the functionality described in accordance with one or more embodiments of the invention. Examples of computing devices include, but are not limited to, a server (e.g., a blade-server in a blade-server chassis), a virtual machine (VM), a desktop computer, a mobile device (e.g., laptop computer, smart phone, personal digital assistant, tablet computer, and/or any other mobile computing device), and/or any other type of computing device with the aforementioned minimum requirements.

In embodiments of the invention in which the computing device on which the accounting report generator executes is a set of devices, such devices may or may not be co-located with one another. For example, if not co-located, the various components of the accounting report generator (102) may be operatively connected via a network (not shown). In one or more embodiments of the invention, a network is a collection of one or more network devices (not shown) that facilitate network connectivity for one or more operatively connected entities and/or devices (e.g., utility provider (100), accounting report generator (102) and/or components therein, report data repository (116), etc.).

In one or more embodiments of the invention, the network may be all or a portion of a computer network. A computer network may include a datacenter network, a wide area network, a local area network, a wireless network, a cellular phone network, or any other suitable network that facilitates the exchange of information from one part of the network to another. In one or more embodiments, the network may be coupled with or overlap with the Internet.

In one or more embodiments of the invention, the accounting report generator is all or a portion of a database management system (DBMS). In one or more embodiments of the invention, a DBMS interacts with one or more entities, such as users or other computer applications, to analyze, access, or post data in a database. An example of a DBMS is a relational DBMS, which additionally manage relationships between one or more databases. Other examples of types of DBMSs include, but are not limited to, column oriented and row oriented DBMSs.

In one or more embodiments of the invention, various components of the accounting report generator (102) (e.g., data posting logic engine (104), calculation engine (114)), which are described further below, may be implemented as a set of modules that handle different functions of the accounting report generator (102). Each module may include circuitry that is a part of a processing system (not shown), firmware, software, and/or a combination thereof. In various embodiments, modules may be standalone modules, or may be implemented as various combinations of modules. Any one or more modules may be linked to any one or more other modules, with such links allowing the modules to function together to form a system.

As a non-limiting example, a module or set of modules (e.g., accounting report generator (102)) may include software written in any programming language (e.g., a database query language), which may be stored on volatile and/or non-volatile memory. Such software, when executed, may lead, directly (e.g., via compilation) or indirectly (e.g., via interpretation), to the generation of machine code (e.g., binary numbers such as 11010101) used as input to at least a portion of the integrated circuitry of one or more processors. Input of machine code to the processor(s) may cause various effects within the circuitry of the processor(s), with such effects implementing at least a portion of the programming language source code from which the machine code was derived. Examples of such effects include, but are not limited to: biasing a transistor to allow current flow or not; creating connections between various portions of the circuitry; causing current to flow through various portions of circuitry; causing the voltage across a circuit element to change; etc. Said another way, as used herein, a module or set of modules, such as data posting logic engine (104) or calculation engine (114), configured to perform certain functionality should be understood to include software and/or firmware, as well as at least a portion of the underlying computing hardware (e.g., integrated circuitry) on which the software executes.

In one or more embodiments of the invention, the accounting report generator (102) includes and/or is operatively connected to a data posting logic engine (104). In one or more embodiments of the invention, the data posting logic engine (104) is any hardware (e.g., circuitry), software, firmware, or any combination thereof that includes functionality to receive accounting information from one or more utility providers (e.g., utility provider (100)), and process the data for posting in a database (e.g., accounting database (106)). In one or more embodiments of the invention, the data posting logic engine (104) includes one or more rules sets and/or collections of processing logic for generating one or more line items using received accounting information.

In one or more embodiments of the invention, the data posting logic engine (104) is operatively connected to an accounting database (106). In one or more embodiments of the invention, an accounting database (106) is any organized collection of data capable of storing accounting information as one or more line items (described below). A database may be stored in any storage medium. Examples of such mediums include volatile memory such as RAM, non-volatile storage such as disk, solid state drive, tape storage, etc. In one or more embodiments of the invention, at least a portion of the accounting database (106) is implemented entirely within volatile memory of a computing device.

In one or more embodiments of the invention, the accounting database (106) includes one or more line items (e.g., line item (108)). In one or more embodiments of the invention, a line item (108) is any collection of data that represents accounting information. For example, a line item may capture all or any portion of information necessary to create a balance sheet, create an income statement, create a cost center report, capture a given financial transaction, etc. In one or more embodiments of the invention, a line item may include any number of data fields (e.g., field A (110), field N (112), etc.), each of which may include any amount of information and/or any relationship to any other information in the accounting database (106). As an example, for a given work order for a given task, the work order may include many lines of information, and each line of information included in the work order may be processed by the data posting logic engine (104) into a separate line item separated into a number of data fields (e.g., approximately 300 fields) and stored in the accounting database (106). In one or more embodiments of the invention, the data posting logic (104) includes functionality to add additional fields to a line item to allow a calculation engine (114) to generate transactional reports, financial accounting reports, regulatory accounting reports, and/or generate transactional flow traces, such as cost flow traces.

In one or more embodiments of the invention, the accounting database (106) also includes and/or is operatively connected to a calculation engine (114), which may also be part of a DBMS and/or the accounting report generator (102). In one or more embodiments of the invention, the calculation engine is any hardware (e.g., circuitry), software, firmware, or any combination thereof that includes functionality to access accounting data stored in one or more line items, and to perform calculations relating to such accounting information. Said calculations may be used, in whole or in part, to generate financial accounting reports, regulatory accounting reports, and/or to perform cost flow tracing. In one or more embodiments of the invention, certain data fields stored in various line items are used to perform the aforementioned acts of generation.

In one or more embodiments of the invention, the accounting report generator (102) is also operatively connected to a report data repository (116). In one or more embodiments of the invention, the report data repository (116) is any type of storage unit and/or device (e.g., a file system, database, collection of tables, or any other storage mechanism) for storing data. Further, the data repository (116) may include multiple different storage units and/or devices. The multiple different storage units and/or devices may or may not be of the same type or located at the same physical site. In one or more embodiments of the invention, the report data repository (116) includes functionality to store reports generated by the account report generator (102). Such reports include but are not limited to, financial accounting reports (122) (e.g., reports related to GAAP accounting), regulatory account reports (118), and/or reports related to cost flow traces (120). In one or more embodiments of the invention, reports from the report data repository may be obtained and provided to any interested entity, such as investors, relevant local government councils, etc.

While FIG. 1 shows a configuration of components, other configurations may be used without departing from the scope of the invention. For example, various components may be combined to create a single component. As another example, the functionality performed by a single component may be performed by two or more components. Accordingly embodiments of the invention should not be considered limited to the specific arrangement of elements shown in FIG. 1.

Figure 2:
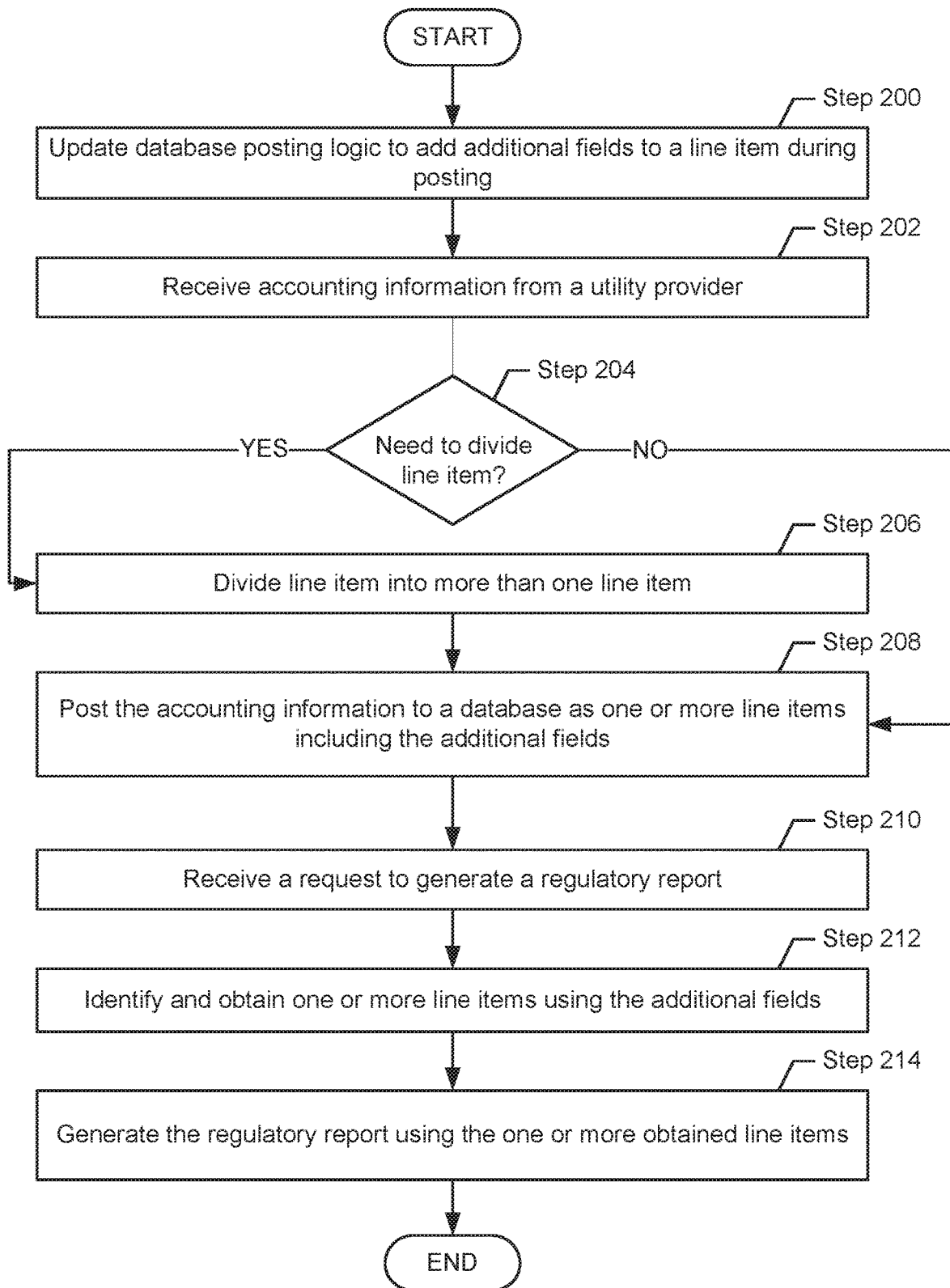
FIG. 2 shows a flowchart in accordance with one or more embodiments of the invention.

FIG. 2 shows a flowchart describing a method for adding additional data fields to accounting information line items for use in accounting report generation in accordance with one or more embodiments of the invention. While the various steps in the flowchart of FIG. 2 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 200, database posting logic is augmented so that accounting information received from one or more utility providers may be processed into one or more line items and added to an accounting database with additional fields included to allow for real time analysis and generation of regulatory accounting reports, as well as to allow for cost flow tracing. In one or more embodiments of the invention, the processing includes the creation of various fields, each of which may include accounting information as well as information for use in relating the line items to various accounting reports and/or to other line items. In one or more embodiments of the invention, the various accounting reports include both financial accounting reports and regulatory accounting reports. In one or more embodiments of the invention, the regulatory reports also include reports of cost flow tracing, which may trace costs settled on an asset (e.g., a sub-station that a utility provider is building) and/or cost center through a series of intermediate settlement steps to the origin of the costs.

In one or more embodiments of the invention, the augmentation of the database posting logic causes the line items to be posted to an accounting database with additional fields that facilitate the generation of regulatory reports, including the aforementioned regulatory accounting reports and cost flow traces. Such additional fields are included along with fields for performing financial accounting (i.e., financial accounting fields) For example, fields may be added that associate a given line item with one or more types of regulatory accounting reports (e.g., reports related to insurance, benefits, etc.). As another example, the added fields may relate the line items to one or more partner objects in other line items and/or reports, as well as to one or more assets to which costs represented by the line item settle, which may facilitate the cost flow tracing.

In Step 202, accounting information is received from a utility provider. In one or more embodiments of the invention, accounting information may be received in any manner. For example, such information may be provided to a third part provider of database services for accounting report generation over a network. As another example, the accounting information may be received via input of the data to a computing device (e.g., accounting report generator (102) of FIG. 1).

In Step 204, a decision is made whether a given line item needs to be split (i.e., divided). In one or more embodiments of the invention, a line item needs to be split when the level of granularity required for regulatory accounting report generation is greater than that required for financial accounting report generation. For example, the cost of labor for a utility provider to perform maintenance may merely be recorded as a labor cost for the purposes. However, the same cost may need to be broken down into accounts for income tax, benefits, and base salary for regulatory accounting reports. In such a case, the line item may need to be split into three line items. If the line item should be split for regulatory accounting purposes, the process shown in FIG. 2 proceeds to Step 206. If the line item does not need to be split, the process continues to Step 208.

In Step 206, the line item is split (i.e., divided) into two or more line items. Dividing the line item may include breaking a given cost included in received accounting information from a utility provider into as many separate line items as are required to provide a requisite level of granularity to identify costs for regulatory accounting purposes. In one or more embodiments of the invention, the total cost represented by the line items after the division is equivalent to the total cost that would have been in a single line item for the cost, and thus aggregation of the costs in the line items after division still allows for performance of financial accounting report generation and analysis.

In Step 208, the one or more line items augmented with additional fields for regulatory accounting reports and cost flow tracing are posted to the database. In one or more embodiments of the invention, adding line items to a database may be performed in any manner of storing the line items. For example, the line item may be written, by a processor of a computing device, to a memory address of an in-memory database.

In Step 210, a request is received to generate a regulatory report. As used herein, a regulatory report may refer to a regulatory accounting report (e.g., a FERC report) or may refer to a request to trace the flow of a cost through settlement. In one or more embodiments of the invention, the request may come from any interested entity. Examples of such entities include, but are not limited to, decision makers at utility providers, regulatory entities, etc. Such request may be received in any manner. For example, a utility provider may request the report in order to assess the impact of a possible decision on various aspects of regulatory accounting, which may affect the rate that the utility provider is allowed to charge customers for the service of provided the utility. As another example, once a regulatory accounting report has been provided to a regulatory entity, said regulatory entity may request the utility provider from which the report was received to provide an analysis detailing the origination of various costs that settle on a given asset or cost center.

In Step 212, one or more line items are identified and obtained for use in generating a regulatory report, with the line items identified using one or more of the additional fields added to the line item in Step 208. In the case of regulatory accounting reports, the additional fields may, for example, relate the line item to a certain aspect of regulatory reporting, such as insurance, benefits, identifying a cost as related to one or more assets under construction, etc. In the case of cost flow trace analysis, the additional fields may relate the line item to an asset and/or cost center to which the cost in the line item ultimately settles, as well as to a partner object in another accounting report and/or line item. For example, a cost of labor may be associated with the asset that the labor is ultimately being used to construct, as well as to a specific work order within a certain project. Such fields allow for cost flow tracing by working back from a given asset or cost center to different levels of settlement that occur before final settlement with the asset and/or cost center.

In Step 214, a regulatory report is generated using the one or more obtained line items. For example, in the case of regulatory accounting reports, various line items related to an asset under construction may be obtained so that line items that appear as costs for the purposes of financial accounting reports may be settled real time with respect to the asset under construction that the costs are applied towards. As another example, in the case of cost flow tracing, a series of line items may be obtained and used to create a report of a cost flow trace by associating an asset or cost center with a number of projects, then a given project with a number of work orders and/or invoices, and then finally a given work order or invoice with the cost it represents (e.g., labor cost, cost of supplies, sub-contractor cost, etc.).

Additionally, though not shown in FIG. 2, generation of a regulatory report may include the use of a settlement percentage table. In one or more embodiments of the invention, a settlement percentage table may divide a given cost among various settlement locations (i.e., assets or cost centers). For example, a given purchase of supplies from a vendor may be a cost with 40% attributed to one asset under construction and 60% to another asset under construction.

Also, though not shown in FIG. 2, the line items with additional regulatory accounting fields added may, via included financial accounting fields, still be used to perform financial accounting tasks such as financial accounting report generation. In the event that a line item was divided for regulatory reporting purposes, the costs represented in the divided line items may be identified using a financial accounting field common to the divided line items and aggregated to perform the financial accounting task.

FIG. 3.1 and FIG. 3.2 show an example in accordance with one or more embodiments of the invention. The following example is for explanatory purposes only and not intended to limit the scope of the invention.

Referring to FIG. 3.1, consider a scenario in which accounting information has been received from a utility provider by an accounting report generator. A data posting logic engine of the accounting report generator processes the accounting information to create line item (300) that includes a number of fields (field A (302), field N (304)). Unmodified, line item (300) may be used for real time reporting related to GAAP accounting. However, previously, to perform regulatory reporting, a utility provider would need to wait until the end of a monthly reporting cycle, then replicate line items such as line item (300) for use in regulatory reporting, and then regulatory reports and GAAP accounting reports would need to be reconciled, which is often a manual and/or time consuming process. However, as shown in FIG. 3.2, these issues are alleviated by the addition of a regulatory accounting field (306) to line item (300). The regulatory accounting field in this example identifies the line item as related to a new power transmission site under construction by the utility provider. In such an example, the line item may be used as normal for the purpose of GAAP accounting reports, and then may also be used without the need for replication of data to perform real time settlement of the cost represented by the line item to the power transmission site, which is the asset under construction that the cost was spent to help construct.

FIGS. 4.1-4.4 show an example in accordance with one or more embodiments of the invention. The following example is for explanatory purposes only and not intended to limit the scope of the invention.

Referring to FIG. 4.1, consider a scenario in which accounting information has been received from a utility provider by an accounting report generator. In such scenario, the accounting information relates to a cost for maintenance labor of an employee for $1000 pursuant to a work order. A data posting logic engine of the accounting report generator processes the accounting information to create line item (400) that includes a number of fields (field A (402), field N (404)). Unmodified, line item (400) may be used for real time reporting related to GAAP accounting that counts the cost merely as a cost of labor. However, for regulatory reporting, the cost may need to be divided into separate line items, one for insurance, one for benefits, and one for base salary. Thus, as shown in FIG. 4.2, FIG. 4.3, and FIG. 4.4, line item (400) is divided into three line items (400A, 400B, and 400C). Each of these new line items include Field A (402), which may be used for GAAP accounting purposes. Each of the new line items for regulatory accounting purposes also includes a field related to cost (404A, 404B, 404C) that, in aggregate, total to the same cost represented by cost field N (404) of FIG. 4.1 before line item (400) was divided. Finally, the divided line items (400A, 400B, and 400C) each include a regulatory accounting field. Regulatory accounting field (406) in FIG. 4.2 allows the portion of the cost represented by cost field (404A) to be associated with insurance. Regulatory accounting field (408) in FIG. 4.3 allows the portion of the cost represented by cost field (404B) to be associated with benefits. Regulatory accounting field (410) in FIG. 4.4 allows the portion of the cost represented by cost field (404C) to be associated with the base salary of the employee. With such a division of line item (400), regulatory reports can be generated as required for insurance related reports, benefits related reports, and/or base salary related reports. Such a level of granularity is often required by regulatory entities to which utility providers must provide reports.

FIG. 5.1 and FIG. 5.2 show an example in accordance with one or more embodiments of the invention. The following example is for explanatory purposes only and not intended to limit the scope of the invention.

Referring to FIG. 5.1, consider a scenario in which accounting information has been received from a utility provider by an accounting report generator. A data posting logic engine of the accounting report generator processes the accounting information to create line item (500) that includes a number of fields (field A (502), field N (504)). Unmodified, line item (500) may be used for real time reporting related to GAAP accounting. However, to perform regulatory reporting, and specifically cost flow tracing, a utility provider would need to manually examine a given asset and trace all of the many costs associated with the asset through various levels of intermediate settlement in an attempt to determine where the various costs originated. However, as shown in FIG. 5.2, these issues are alleviated by the addition of a partner object field (506) to line item 500, as well as two fields related to the asset (asset field A (508) and asset field B (510)). The asset fields (508 and 510) in this example identify the line item as related to a specific asset. The partner object field relates line item (500) to an intermediate settlement shown in another line item or accounting report. For example, the partner object field for a line item representing cost of certain supplies may associate line item (500) with another line item (not shown) that represents a purchase order for supplies, which may, in turn, have a partner object field (not shown) that relates the purchase order to a sub-project, which is related finally to the asset of concern. In such an example, the line item (500) may be used as normal for the purpose of GAAP accounting reports, and then may also be used without the need for replication of data to perform real time cost flow tracing.

In some embodiments, in one aspect, the disclosed technology relates to a method. The method may include updating database posting logic to obtain updated database posting logic configured to, during a posting process to a database, add a first regulatory accounting field to a new line item being posted via the posting process. The method may further include receiving accounting information from a utility provider. The method may further include receiving a request to generate a regulatory report. The method may further include using the regulatory accounting field to identify the accounting line item. The method may further include generating the regulatory report using the accounting line item. In some embodiments, in one aspect, the disclosed technology relates to non-transitory computer readable medium including instructions that, when executed by a computer processor, perform the method.

In another embodiment, the regulatory report includes a regulatory accounting report. In another embodiment, accounting information includes settlement information or allocation information. In another embodiment, the method may include before posting the accounting line item using the accounting line item to create first sub-line item and a second sub-line item, the first sub-line item including the first regulatory accounting field; and adding a second regulatory accounting field to the second sub-line item, wherein an aggregate total cost amount represented by the first sub-line item and the second sub-line item match a total cost amount of the accounting line item, and both the first sub-line item and the second sub-line item are used in generating the regulatory report. In another embodiment, the regulatory report is a cost flow trace. In another embodiment, generating the cost flow trace includes tracing a cost from a final expenditure-to-asset document to an original expenditure-to asset document including an original expenditure in the accounting line item. In another embodiment, the database is an in-memory database. In another embodiment, the database is managed by a column-oriented database management system.

In some embodiments, in one aspect, the disclosed technology relates to a system. The system may include an accounting report generator operatively connected to a utility provider and a report data repository. The accounting reporter generator may include a data posting logic engine, an accounting database operatively connected to the data posting logic engine, and a calculation engine operatively connected to the accounting database. The accounting report generator may be configured to update the database posting logic engine to obtain an updated database posting logic engine configured to, during a posting process to a database, include a financial accounting field and add a first regulatory accounting field to a new line item being posted via the posting process. The accounting report generator may be further configured to receive accounting information from a utility provider. The accounting report generator may be further configured to post, using the updated database posting logic engine, the accounting information to the accounting database as an accounting line item including various fields including the financial accounting field and the first regulatory accounting field. The accounting report generator may be further configured to receive a request to generate a regulatory report. The accounting report generator use the regulatory accounting field to identify the accounting line item. The accounting report generator may be further configured to generating the regulatory report using the accounting line item using the calculation engine. The accounting report generator may be further configured to store the regulatory report in the report data repository. The accounting report generator may be further configured to receive a second request to generate a financial accounting report. The accounting report generator may be further configured to use the financial accounting field to identify the accounting line item. The accounting report generator may be further configured to generating the financial accounting report using the accounting line item using the calculation engine. The accounting report generator may be further configured to store the financial accounting report in the report data repository.

In some embodiments, the regulatory report includes a regulatory accounting report. The accounting report generator may be further configured to, before posting the accounting line item use the accounting line item to create first sub-line item and a second sub-line item, the first sub-line item including the first regulatory accounting field. The accounting report generator may be further configured to add a second regulatory accounting field to the second sub-line item. An aggregate total cost amount represented by the first sub-line item and the second sub-line item may match a total cost amount of the accounting line item. Both the first sub-line item and the second sub-line item may be used in generating the regulatory report.

Embodiments of the invention may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 5.1 may be connected to or be a part of a network. For example, as shown in FIG. 5.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 5.1. Further, the client device (626) may include and/or perform all or a portion of one or more embodiments of the invention.

The computing system or group of computing systems described in FIGS. 6.1 and 6.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user and/or a utility provider. For example, in one or more embodiments, a user may submit data via a graphical user interface (GUI) on a user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6.1. First, the organizing pattern (e.g., grammar, schema, layout) of the data is determined. Then, the raw, unprocessed stream of data symbols is parsed, in the context of the organizing pattern, into a relevant database structure The computing system in FIG. 6.1 may implement and/or be connected to one or more data repository. For example, as described above, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

The above description of functions present only a few examples of functions performed by the computing system of FIG. 6.1 and the nodes and/or client device in FIG. 6.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
 updating database posting logic to obtain an updated database posting logic configured to, during a posting process to a database, add a first data field to a new line item being posted via the posting process, the first data field identifying a relationship of the new line item to a regulatory accounting type of a financial transactional report;
 receiving information from a data provider;
 posting, using the updated database posting logic, the information to the database as a line item comprising a plurality of fields, wherein the posting comprises adding the first data field to the plurality of fields;
receiving a request to generate the financial transactional report;
identifying the regulatory accounting type of the financial transactional report;
identifying the line item based on the first data field identifying the relationship of the line item to the regulatory accounting type of the financial transactional report; and
generating the financial transactional report using the line item.

2. The method of claim 1, wherein the database is a relational database that provides a real time update to the financial transactional report using the updated database posting logic and the information from the data provider.

3. The method of claim 1, further comprising, before posting the line item:
splitting the line item into a first sub-line item and a second sub-line item based on a granularity required for the regulatory accounting type of the financial transactional report.

4. The method of claim 1, wherein the posting further comprises adding a second data field to the plurality of fields, the second data field added to relate the line item to an asset, and wherein the method further comprises:
generating a transaction flow trace using the line item and the second data field.

5. The method of claim 1, wherein the database is an in-memory database.

6. The method of claim 1, wherein the database is managed by a column-oriented database management system.

7. A non-transitory computer readable medium comprising instructions that, when executed by a computer processor, perform a method comprising:
updating database posting logic to obtain an updated database posting logic configured to, during a posting process to a database, add a first data field to a new line item being posted via the posting process, the first data field identifying a relationship of the new line item to a regulatory accounting type of a financial transactional report;
receiving information from a data provider;
posting, using the updated database posting logic, the information to the database as a line item comprising a plurality of fields, wherein the posting comprises adding the first data field to the plurality of fields;
receiving a request to generate the financial transactional report;
identifying the regulatory accounting type of the financial transactional report;
identifying the line item based on the first data field identifying the relationship of the line item to the regulatory accounting type of the financial transactional report; and
generating the financial transactional report using the line item.

8. The non-transitory computer readable medium of claim 7, wherein the database is a relational database configured to provide a real time update to the financial transactional report using the updated database posting logic and the information from the data provider.

9. The non-transitory computer readable medium of claim 7, the method further comprising, before posting the line item:
splitting the line item into a first sub-line item and a second sub-line item based on a granularity required for the regulatory accounting type of the financial transactional report.

10. The non-transitory computer readable medium of claim 7, wherein the posting further comprises adding a second data field to the plurality of fields, the second data field added to relate the line item to an asset, wherein the method further comprises:
generating a transaction flow trace using the line item and the second data field.

11. The non-transitory computer readable medium of claim 7, wherein the database is an in-memory database.

12. The non-transitory computer readable medium of claim 7, wherein the database is managed by a column-oriented database management system.

13. A system, comprising:
a report generator operatively connected to a data provider and a report data repository and comprising:
a data posting logic engine; and
a database operatively connected to the data posting logic engine, and a calculation engine operatively connected to the database,
wherein the report generator is configured to:
update the database posting logic engine to obtain an updated database posting logic engine configured to, during a posting process to a database, include a first data field to a new line item being posted via the posting process, the first data field identifying a relationship of the new line item to a regulatory accounting type of a financial transactional report;
receive information from a data provider;
post, using the updated database posting logic engine, the information to the database as a line item comprising a plurality of fields comprising the first data field, wherein posting comprises adding the first data field to the plurality of fields;
receive a request to generate the financial transactional report;
identify the regulatory accounting type of the financial transactional report;
identifying the line item based on the first data field identifying the relationship of the line item to the regulatory accounting type of the financial transactional report;
generate the financial transactional report using the line item using the calculation engine.

14. The system of claim 13, wherein the database is a relational database that provides a real time update to the financial transactional report using the updated database posting logic and the information from the data provider.

15. The system of claim 13, wherein the report generator is further configured to, before posting the line item:
splitting the line item into a first sub-line item and a second sub-line item based on a granularity required for the regulatory accounting type of the financial transactional report.

16. The system of claim 13, wherein the financial transactional report is a transaction flow trace.

17. The system of claim 13, wherein the database is an in-memory database.

18. The method of claim 1, wherein the financial transactional report is one selected from a group consisting of a regulatory accounting report and a financial accounting report.

19. The non-transitory computer readable medium of claim 7, wherein the financial transactional report is one selected from a group consisting of a regulatory accounting report and a financial accounting report.

20. The system of claim 13, wherein the financial transactional report is one selected from a group consisting of a regulatory accounting report and a financial accounting report.

\* \* \* \* \*